United States Patent
Klipp

[19]

[11] Patent Number: 6,099,239
[45] Date of Patent: Aug. 8, 2000

[54] FRUIT TRAY DENESTING APPARATUS AND METHOD

[75] Inventor: Dennis L. Klipp, Waterville, Me.

[73] Assignee: The Chinet Company Technology, Waterville, Me.

[21] Appl. No.: 09/071,592

[22] Filed: May 1, 1998

[51] Int. Cl.[7] ............................ B65G 59/10
[52] U.S. Cl. ........................ 414/797.4; 414/797.8
[58] Field of Search ............... 414/795.6, 797.8, 414/798.9, 797.4

[56] References Cited

U.S. PATENT DOCUMENTS

| | | |
|---|---|---|
| 1,722,048 | 7/1929 | Hill .................................. 414/797.8 |
| 3,283,952 | 11/1966 | Burt . |
| 3,283,955 | 11/1966 | Crabtree . |
| 3,297,201 | 1/1967 | Burt . |
| 3,341,072 | 9/1967 | Van Der Schoot . |
| 3,478,924 | 11/1969 | Comstock . |
| 3,664,521 | 5/1972 | Feher ................................. 414/795.6 |
| 4,095,721 | 6/1978 | Patzlaff . |
| 4,108,321 | 8/1978 | Lowery . |
| 4,260,311 | 4/1981 | Hanses . |
| 4,293,272 | 10/1981 | Jellema . |
| 4,305,691 | 12/1981 | Mayer ................................ 414/797.8 |
| 4,328,908 | 5/1982 | Temming . |
| 4,439,101 | 3/1984 | Orlowski . |
| 4,789,291 | 12/1988 | Allan . |
| 4,872,939 | 10/1989 | McVay . |
| 4,909,412 | 3/1990 | Cerf . |
| 5,365,717 | 11/1994 | McKinlay . |
| 5,480,280 | 1/1996 | Bordon ............................... 414/795.6 |
| 5,827,068 | 10/1998 | Sims . |
| 5,876,180 | 3/1999 | Sims . |
| 5,941,681 | 8/1999 | Piotrowski ......................... 414/797.8 |

FOREIGN PATENT DOCUMENTS

| | | | |
|---|---|---|---|
| 2450767 | 11/1980 | France .............................. 414/797.8 |
| 3-177228 | 8/1991 | Japan ................................ 414/797.8 |

*Primary Examiner*—Gregory A. Morse
*Attorney, Agent, or Firm*—Connolly Bove Lodge & Hutz LLP

[57] ABSTRACT

An apparatus and method are described for delivering fruit trays such as molded pulp apple trays from a nested stack to a conveyer. A carriage arrangement which is moveable relative to the tray stack and the conveyer is provided with support arms and grasping arms. As the apparatus moves through a tray-delivering cycle, the tray stack is supported by the support arms and the lowermost tray is grasped from the stack by the grasping arms and released onto the conveyer.

27 Claims, 7 Drawing Sheets

FRUIT TRAY DENESTING APPARATUS AND METHOD

The invention relates to the field of fruit packaging, and in particular, to an apparatus and method for dispensing fruit trays from a nested stack of fruit trays to a fruit packing line.

BACKGROUND OF THE INVENTION

In large-scale fruit packing operations, such as apple packing houses, fruit is prepared for shipping in packing lines. The fruit is placed into lightweight packing trays made of molded pulp, plastic or the like. The trays filled with fruit are then loaded into boxes for shipment.

Apple trays are made in different sizes to accommodate different sizes of apples. The trays are shaped to contain fruit-holding pockets into which the fruit is placed. The size of an apple tray, by convention, refers to the number of apples per bushel box. For different size apples, the size and number of the fruit-holding pockets is different on the trays. Also by convention, the overall outer dimensions of every size of apple tray are the same or very similar, which permits all of the different sizes of apples to be packed in a standard-sized shipping box. Normally, apple trays are rectangular and have length and width dimensions of 19.5 inches and 12 inches, respectively. These sides of a standard apple tray are referred to herein as the "long" sides and the "short" sides of the tray.

Apple trays are sold to apple packing houses in nested stacks. In a packing operation, trays are dispensed from the nested stacks either manually or by machine and are individually fed to a conveyer belt, where they are transported through the packing line and filled with apples. At the end of the packing line, the filled trays are loaded into shipping boxes. The packing line can convert from packing one size of apple to a different size of apple by changing the size of the apple trays being dispensed into the packing line.

Apparatus exist in the art for individually delivering items from a nested stack, such as fruit trays, egg cartons, and the like onto a conveyer. Exemplary disclosures from the prior art include U.S. Pat. No. 4,328,908 to Temming; U.S. Pat. No. 4,789,291 to Allan; U.S. Pat. No. 3,341,072 to van der Schoot; U.S. Pat. No. 3,283,955 to Crabtree; U.S. Pat. No. 3,283,952 to Burt; and U.S. Pat. No. 3,297, 201 to Burt.

The fruit tray denesting apparatus used in the art have a number of shortcomings. For example, in some prior art apple tray denesting machines, the trays are loaded upside down into the dispenser, and each tray must be flipped over (as it is fed or before it is fed) onto the conveyer. This manner of operation has proven to be problematic in use.

In a different apparatus currently in use, apple trays are fed from a nested stack to the conveyer without being overturned. This apparatus makes contact with integrally-formed and identically-located structures provided on the long sides of the trays specifically for the purpose of contact with the denesting apparatus. Due to the nonuniformity in shape of different size apple trays along the long sides of the tray, and the fact that not all tray styles provide specific engagement areas on the long sides of the trays with which contact is made, this device performs with some but not all of the different styles of apple trays which are available. Moreover, since this apparatus works by grasping the trays at the long sides of the trays, there can be interference between the grasping means and the conveyer. In operation, the grasping means of this device actually pass through appropriate openings in the conveyer (and withdraw to below the conveyer after releasing each tray) making each tray-delivering cycle inherently longer and thereby limiting throughput.

SUMMARY OF THE INVENTION

With the foregoing in mind, an object of the invention is to provide an apparatus and method for delivering fruit trays, such as molded pulp apple trays, from a nested stack to a conveyer.

A further object of the invention is to provide an apparatus and method for loading nested fruit trays, such as molded pulp apple trays, from a vertically nested stack, onto a conveyer without overturning each tray in the process of denesting and delivering the tray.

It is a further object of the invention to provide an apparatus and method for dispensing nested fruit trays, such as molded pulp apple trays, which apparatus is useful in connection with various styles of apple trays available from different manufacturers, and which can dispense different styles of apple trays with only minor modification of the apparatus, and with no need to mold specific additional structure into the apple trays for purposes of denesting.

It is a still further object of the invention to provide an apparatus and method for dispensing fruit trays from a nested stack to a conveyer, wherein contact between the denesting equipment and the trays occurs on the short sides of the trays to avoid interference between the denesting equipment and the conveyer during operation.

These and other objects are achieved in an apparatus comprising, in association with a conveyer, a tray source holding a nested stack of trays above the conveyer in upright orientation, a carriage arrangement which can be moved vertically relative to the tray source and relative to the conveyer, support arms on the carriage arrangement for supporting the nested stack of trays in the tray source when the carriage arrangement is moved into tray-accepting position with respect to the tray stack, and grasping arms on the carriage arrangement which can securely grasp the lowermost tray in the tray stack, by the short ends of the tray, to permit removal of the lowermost tray from the stack by movement of the carriage arrangement. The upper surface of each support arm, which contacts the lowermost tray in the nested stack, is provided with changeable surfaces to accommodate style—specific surfaces on the short ends of the trays without structural modification to the apparatus.

The method of the invention comprises positioning a nested stack of the fruit trays above a conveyer in upright orientation, with the short sides of the trays parallel to the direction of movement of the conveyer, providing means for grasping the lowermost tray in the nested stack, grasping the lowermost tray in the nested stack by the short sides of the lowermost tray, and releasing the lowermost tray onto the conveyer. The tray is deposited onto the conveyer in the correct orientation and is not overturned in the process of being dispensed to the conveyer.

DESCRIPTION OF THE PREFERRED EMBODIMENT

The invention will be better understood by reference to the following description of a currently preferred embodiment. The apparatus will be described in connection with dispensing molded pulp apple trays.

With reference to the Figures, the apparatus 10 of the invention is shown positioned relative to a conveyer belt C, onto which the trays from tray stack 11 are deposited one at a time. As those in the art will appreciate, apple trays are normally dispensed from two dispensing apparatus provided together to supply the same conveyer, which allows trays to be provided on the conveyer in alternate orientations. For purposes of this disclosure, it will be understood that, while only one apparatus is described, in normal use, two or more than two of the devices are used in series in connection with the same conveyer to supply trays in the orientations used for packing.

The apparatus comprises a main cylinder 12 which is provided on a base 13, which is supported by support rails 14. The support rails can be held above the floor by legs 15.

Figure 1:
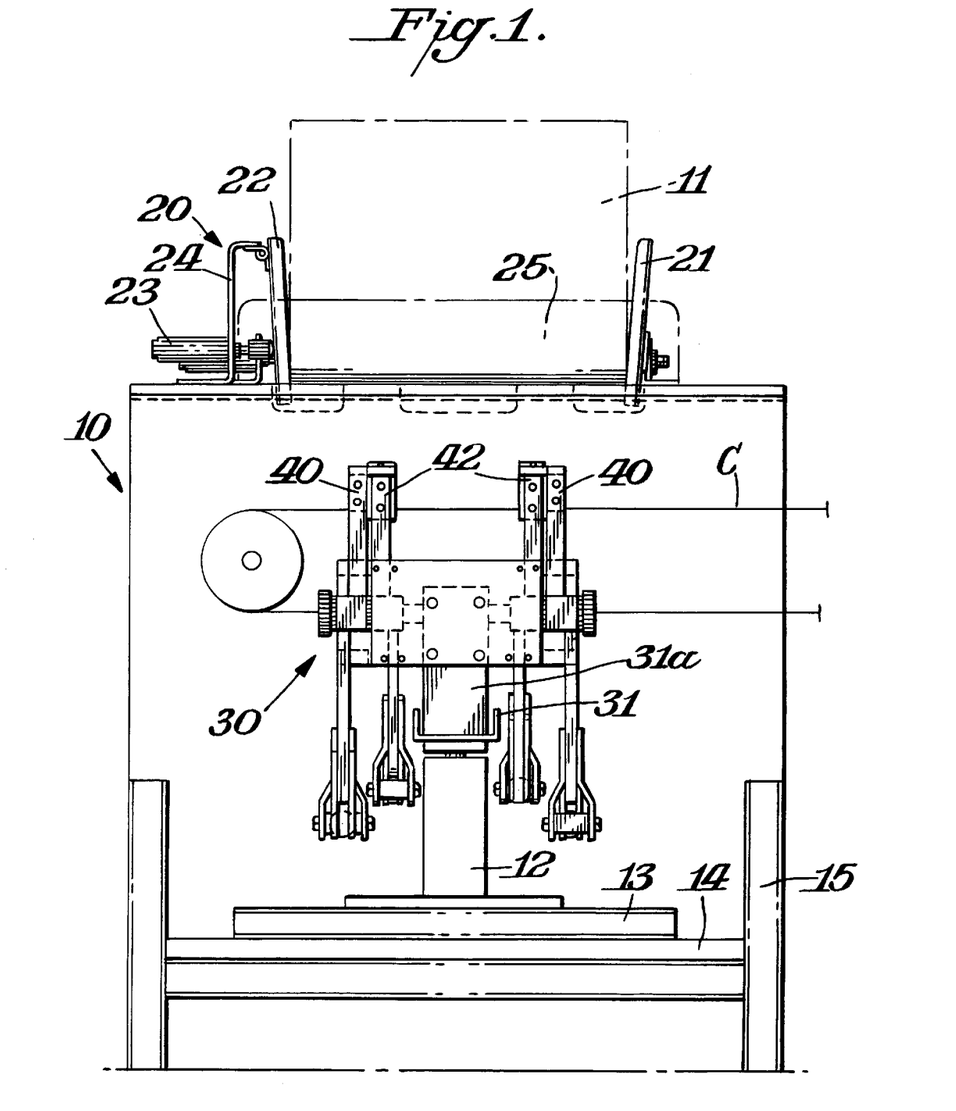
FIG. 1 is a front elevational view of a preferred embodiment of the apparatus of the invention.

As can be seen in FIG. 1, a stack of trays 11 (shown in phantom) is positioned at a distance above the conveyer belt C. The trays may be of any size, with the nested stack of trays being trays of a single size. A preferred arrangement for holding the stack of trays comprises an escapement 20. The escapement comprises stationary brackets 21 lined along one side of the escapement. Along the opposite side of the escapement from the stationary brackets are moveable escapement brackets 22, which are actuated by cylinders 23 through opening braces 24. Along the sides of the escapement which are not provided with brackets run alignment fences 25. A stack of trays is inserted through the open top of the escapement. The trays are inserted in upright position, i.e. with the fruit-receiving pockets facing upward. As described in more detail herein, the opening and closing of the moveable escapement brackets serves to release and hold the tray stack at important points during the tray-dispensing cycle.

Figure 2:
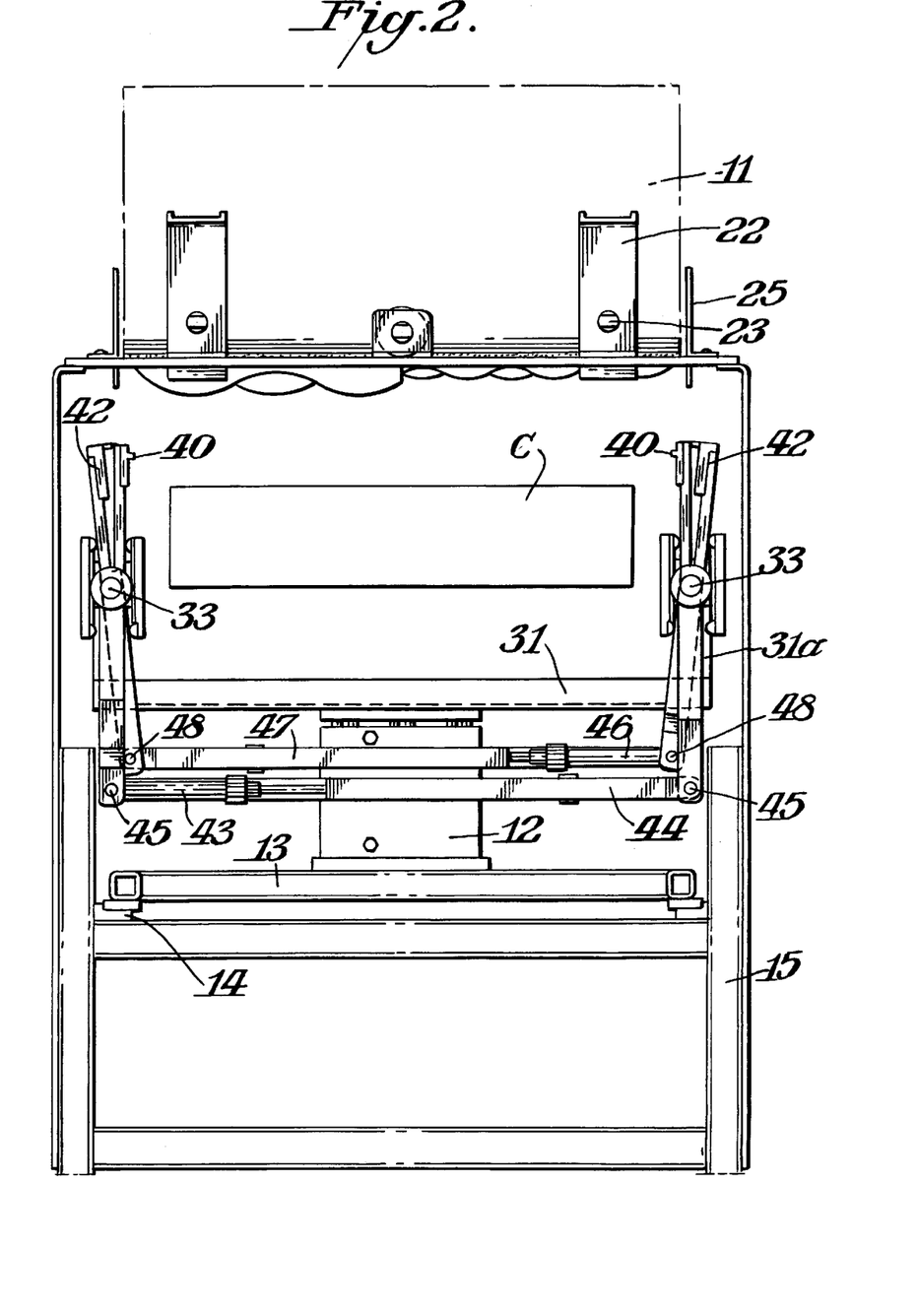
FIG. 2 is a right side elevational view of the embodiment of the apparatus shown in FIG. 1, shown at the start of one cycle prior to commencement of the next cycle.
Figure 3:
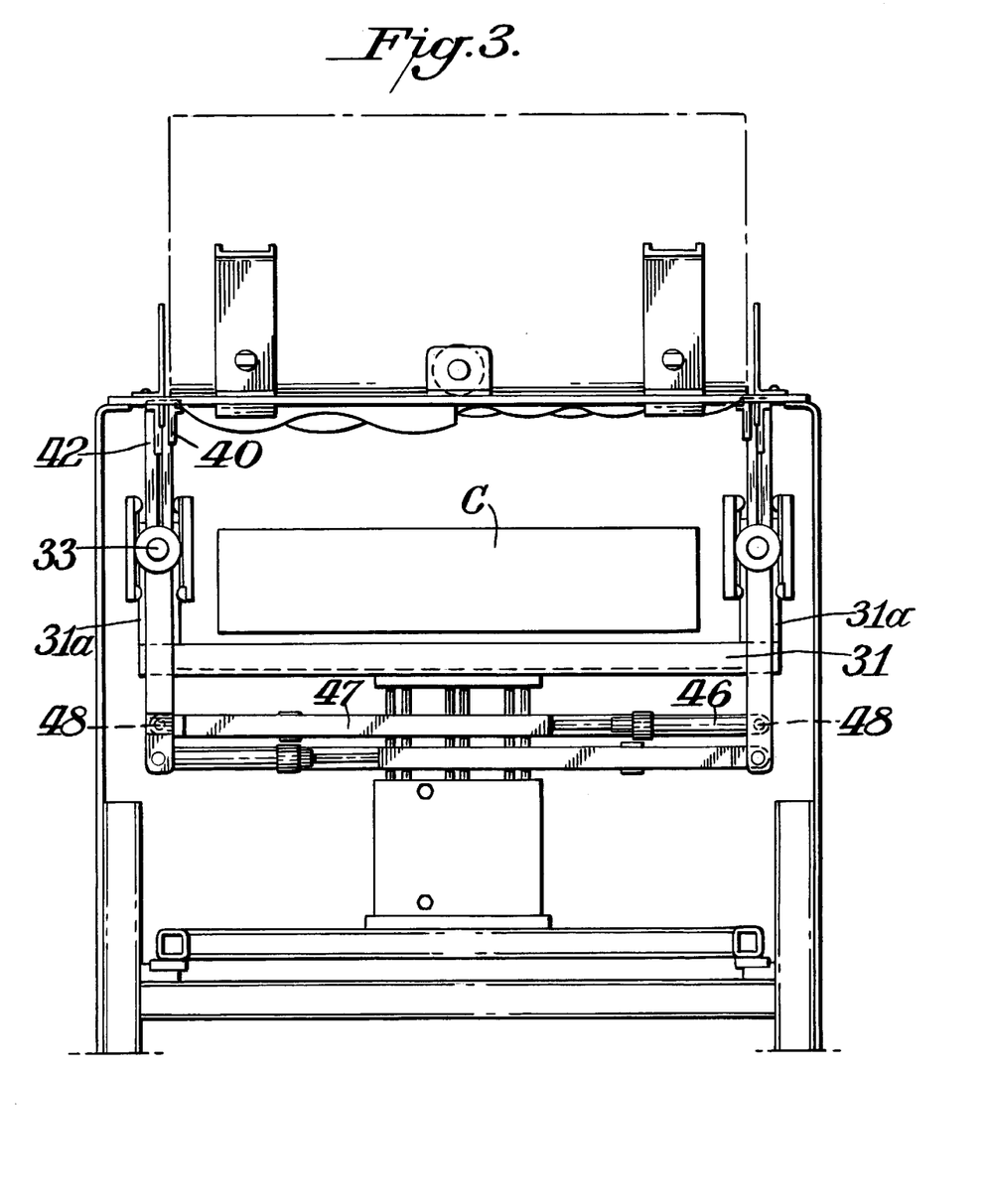
FIG. 3 is the right side elevational view of the embodiment of the apparatus shown in FIG. 1, shown in a tray-grasping position in the cycle.
Figure 4:
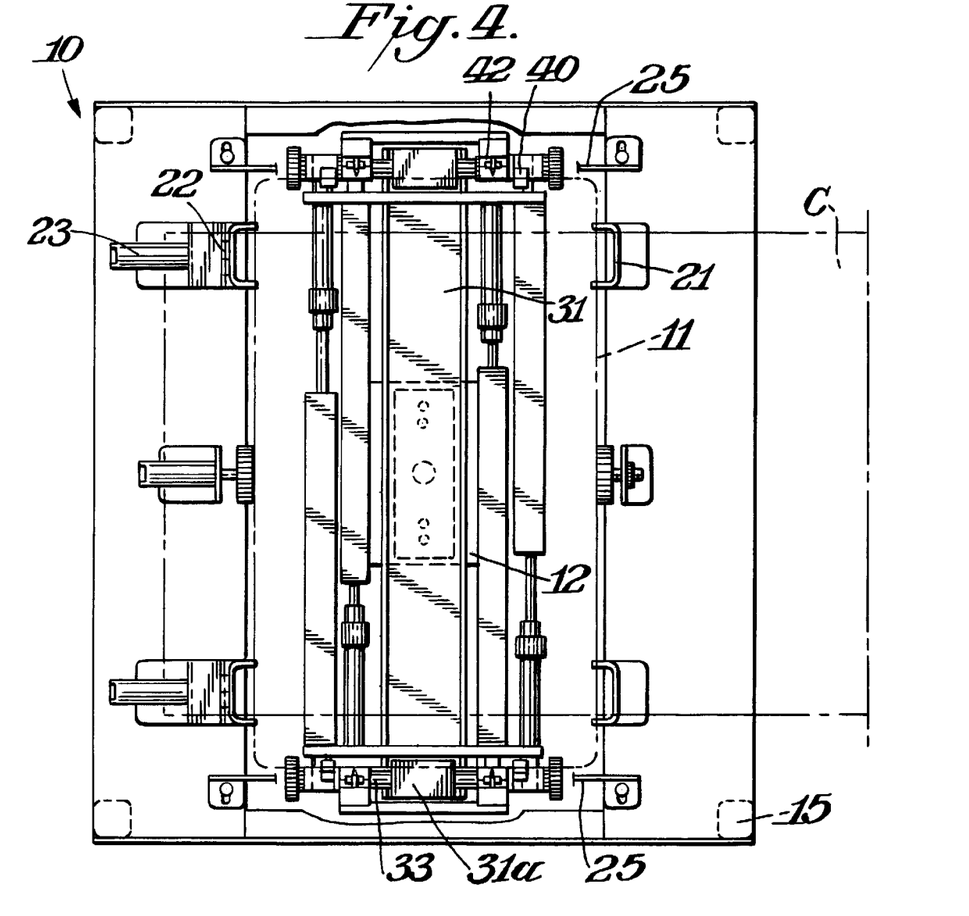
FIG. 4 is a top plan view of the embodiment of FIGS. 1–3.

As seen in FIGS. 1–4, a carriage arrangement 30 is supported and driven by the main cylinder 12. The main cylinder 12 moves the carriage arrangement 30 between a lowered position (FIG. 2) and an elevated or tray-grasping position (FIG. 3).

The carriage arrangement 30 will be described in more detail with reference to FIGS. 14. The primary connection between the main cylinder 12 and the carriage arrangement 30 is channel member 31, which acts as a mounting for the different components of the carriage arrangement. To the channel member are attached vertical components 31a. Since the channel member is connected to the main cylinder, raising or lowering of the channel member by the cylinder acts to raise and lower all of the components of the carriage arrangement together.

The carriage arrangement is modular, and together with main cylinder 12 and base 13, can be removed from the frame by disconnecting the attachment (which may be a simple bolt connection) between the support for the carriage arrangement and the rails. This facilitates service and repair of the components of the carriage arrangement, or replacement of the entire carriage arrangement if necessary.

Positioned on the carriage arrangement relative to each end of the tray stack are support arms 40. At least one support arm is provided on each end of the tray, although preferably two or more support arms, most preferably two, are provided on each end of the tray, as shown in FIGS. 1–4. The support arms are controlled between open and closed positions by support arm cylinders 43. As shown, the support arms are mounted to rock back and forth on main shafts 33 on each side of the carriage arrangement. The opening and closing of the support arm cylinders 43, acting through activator bars 44 and pivot points 45, moves the support arms 40 between an inner or tray-contacting position (FIGS. 2, 5A, 5B, 5C and 5D) and a withdrawn position (FIG. 5E).

In a similar manner, positioned relative to each end of the tray stack are grasping means preferably in the form of grasping arms 42. The grasping arms 42 are rockingly mounted on the same main shafts 33 as are the support arms, and are controlled between an inner or tray-grasping position (FIGS. 5C and 5D) and a withdrawn position (FIGS. 5A, SB and 5E) by the action of separate grasping arm cylinders 46, acting through activator bars 47 and pivot points 48. There is at least one grasping arm on each end of the tray, and preferably two or more, most preferably two, for each end of the tray. While the support arms and the grasping arms on each side of the tray are mounted on the same shaft 33, they are controlled by the action of separate cylinders and can open and close independently of one another.

As noted, there are preferably two support arms and two grasping arms provided for each short side of the tray. The support arms and grasping arms can together form closely spaced pairs. See FIGS. 5 and 6. Thus, in the preferred embodiment, there are two such support arm/grasping arm pairs on each short side of the tray. The pairs on each end of the tray are preferably spaced apart from each other some distance, which in the case of apple trays having 12 inch short sides, is a spacing of several inches.

The coordinated action between the support arms and the grasping arms is central to the operation of the apparatus, and is described below.

As shown in FIG. 2, both the support arms and the grasping arms are positioned to make contact with the short sides of the trays in the tray stack, which is a very important aspect of the invention. For packing, apple trays are usually placed on the conveyer with the short sides of the trays parallel to the direction of movement of the conveyer. Using the structure as described herein, the carriage arrangement, including the support arms and grasping arms, can be freely raised and lowered with little or no interference with the conveyer. For example, the tops of the support arms and grasping arms can lower to the same level as, or even to a level lower than, the top surface of the conveyer without contacting the conveyer. It is not necessary, as in some prior arrangements, for the arms to actually pass through the conveyer (e.g. an elastic band-type conveyer).

As seen in FIGS. 1–3, the action of the main cylinder lifts the entire carriage arrangement relative to the conveyer belt and relative to the stack of trays. Lifting of the carriage arrangement raises the support arms and the grasping arms into a position where they can make contact with the stack of trays.

The operation of the apparatus will be described further with reference to the Figures. FIGS. 5A through 5E together show the position of the support arms and grasping arms during a cycle in the operation of the apparatus whereby the lowermost tray of the nested stack of trays is removed from the stack and deposited onto the conveyer. For clarity in these views, only one support arm/grasping arm pair is shown. The support arm/grasping arm pairs on the other side of the apparatus, and other support arm/grasping arm pair(s) on the same side of the apparatus, which are not shown, are in the same position at each stage of the cycle.

Figure 5A:
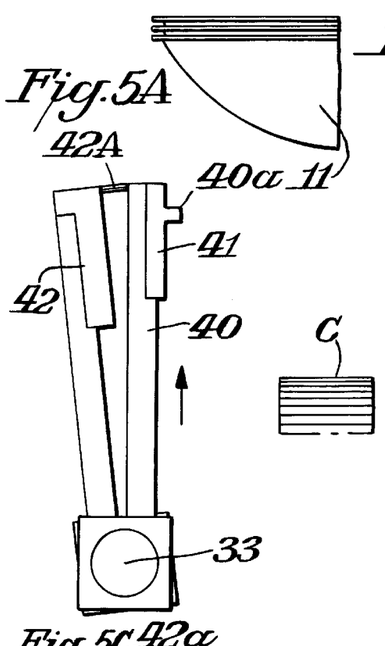
FIGS. 5A through 5E are views of the support arm and the grasping arm as the apparatus moves through a cycle of tray-grasping and release.

In FIG. 5A, the carriage arrangement is in an intermediate position, whereby the support arms and grasping arms are positioned a distance below the lowermost tray in the tray stack. The support arms 40 are held in their inward position. The grasping arms 42 are in the withdrawn position.

As further shown in FIG. 5A, the tops of the grasping arms are provided with lance means 42a, which function to pierce the underside of the tray being withdrawn from the tray stack. The lance means may comprise a razor, pin, pick or the like, sufficient to attach to the bottom tray and remain attached as the lowermost tray is separated from the stack.

Figure 5B:
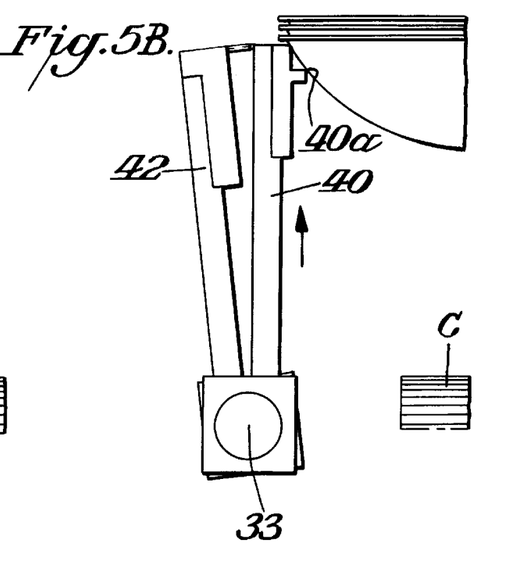
Figure 5C:
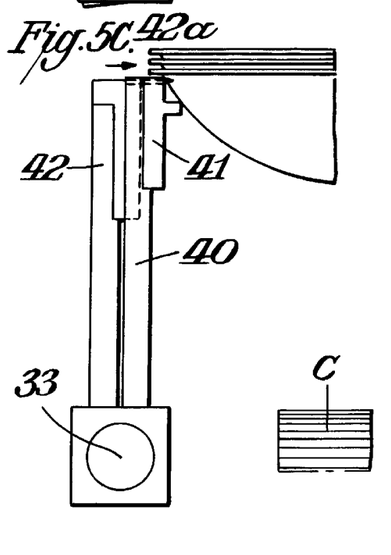
Figure 5D:
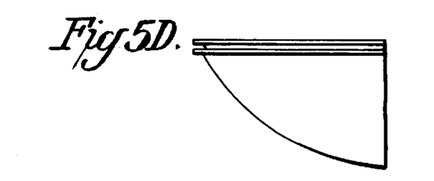
Figure 5E:
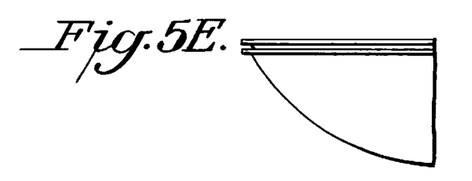
Figure 6:
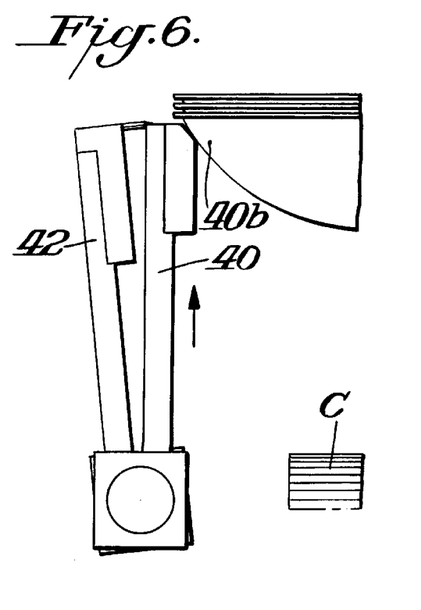
FIG. 6 is a view of the support arm and grasping arm comparable to FIG. 5B showing a different replaceable surface on the support arm to give a different support surface.
Figure 6A:
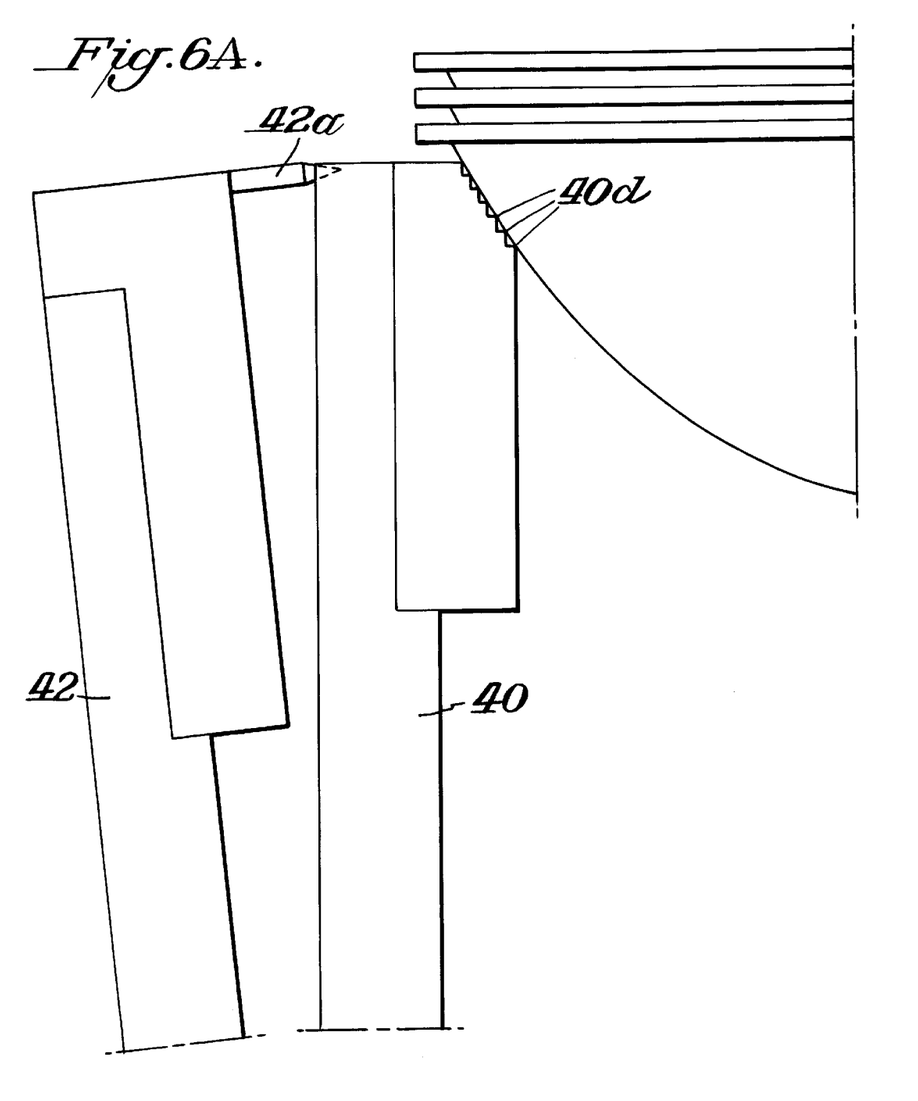
FIG. 6A is an enlarged view of an embodiment showing a textured support surface on the support arm.
Figure 7:
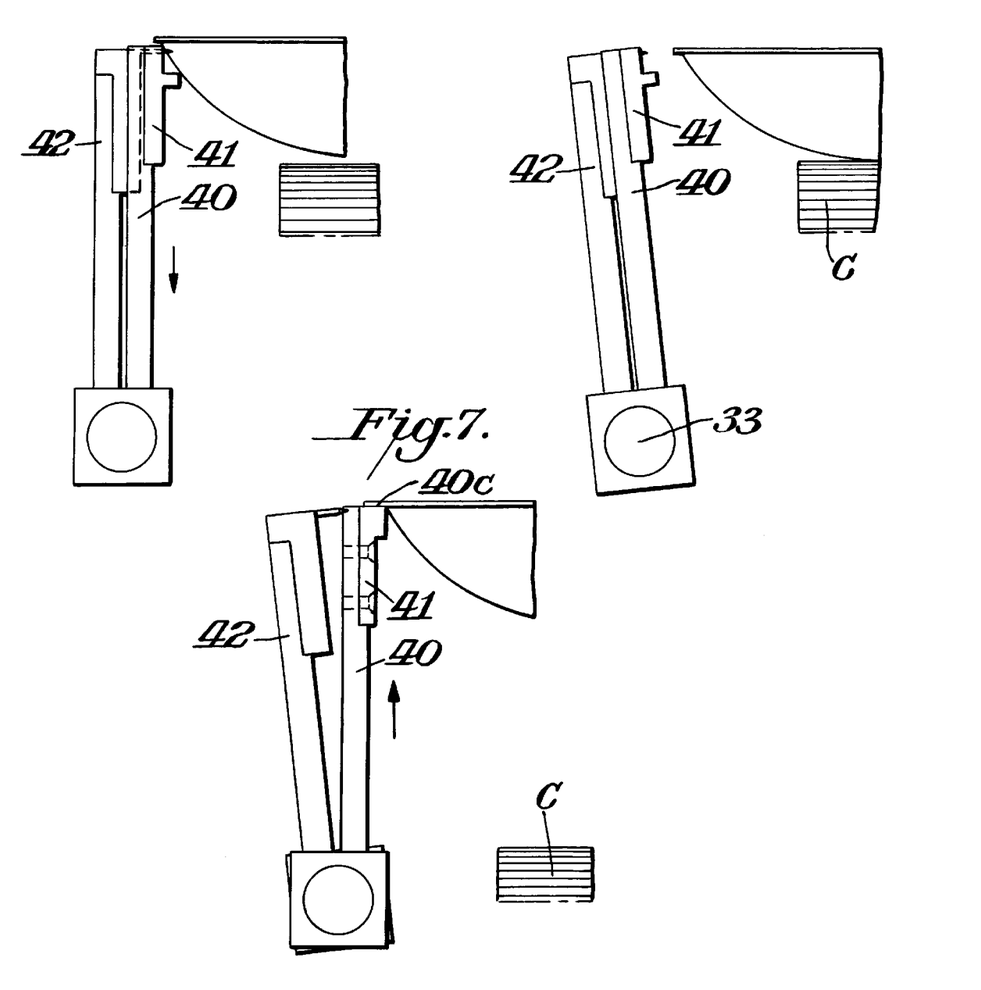
FIG. 7 is a view of the support arm and grasping arm comparable to FIG. 5B showing a different replaceable surface on the support arm to give yet another type of support surface.

With reference to FIGS. 5A to 5E, 6, and 7 the support arms are provided with changeable surfaces such as blocks 41 to permit rapid and convenient modification of the support surface. In one form, the support arm 40 is provided with an L-shaped contact surface 40a for contact with a gradually-sloping surface on the bottom surface of the short sides of the apple tray. Alternatively, the block 41 may have a beveled surface 40b to engage the bottom of the short sides of the tray in a different manner as shown in FIG. 6. The beveled surface can be textured with grooves, notches, knurling or the like to increase the number of contact points, as shown in FIG. 6A. As a further alternative, the block 41 can have a squared surface 40c which engages the tray rim, as shown in FIG. 7. The shape of the support surface can be formed to any desired configuration, to accommodate any style of fruit tray. In the case of rectangular apple trays, once a surface is provided for a given size of tray, no further modification is required to dispense other sizes of trays of the same style.

At the stage shown in FIG. 5A, the escapement is fully closed, and the escapement supports the weight of the stack of apple trays held in the escapement.

In FIG. 5B, the main cylinder has been actuated to drive the carriage arrangement upward, which raises the support arms 40 and the grasping arms 42 up to the height of the lowermost tray in the tray stack. The surface 40a of the support arms rises to just below the bottom surface of the lowermost tray. The grasping arms remain in withdrawn position. The escapement opens at this point by movement of the moveable escapement brackets along one edge of the escapement, allowing the stack of trays to drop a very small distance and come to rest on the four support arms. The escapement then closes, again supporting the weight of the tray stack.

At the stage shown in FIG. 5C, the grasping arm cylinders are actuated, which closes the grasping arms 42. Closing of the grasping arms drives the lance means 42a into the underside surface of the lowermost tray, whereby the lowermost tray is firmly grasped by the grasping arms and securely held.

As shown in FIG. 5D, the carriage arrangement is lowered to move the support arms, the grasping arms, and the captured lowermost tray away from the tray stack. This action pulls the lowermost tray out of the escapement, and towards the conveyer. As shown, both the support arms and the grasping arms remain in their inward position as the carriage arrangement is lowered by the main cylinder. As shown, the withdrawn lowermost tray remains grasped by the grasping arms. However, the support arms could be withdrawn at this point (or at any point after the tray is grasped and the escapement is closed) to minimize the time needed to start the next cycle. The carriage arrangement is lowered to a point where the withdrawn tray is held just above the conveyer.

As shown in FIG. 5E, when the tray has been appropriately positioned above the conveyer, the support arms and the grasping arms are simultaneously withdrawn (opened) by activation of their respective cylinders. This allows the tray to freely drop onto the conveyer to be carried to the packing line, thus completing one cycle of operation.

The cycle described in connection with FIGS. 5A through 5E is repeated to place the nested trays one at a time onto the conveyer. The cycle is controlled by event-driven control means (e.g. electric eye, sensors, and the like). For example, control over cycle initiation can be based on the position of trays downstream on the conveyer belt. Coordination of movements can be provided by computer (e.g. Programmable Logic Controller). Such control means are familiar to those in the art.

It should be appreciated that the action of cylinders described herein could be accomplished using cams, solenoids, or other means of activation.

As mentioned, the device accommodates all sizes of apple trays, since all of the different sizes have essentially the same length and width dimensions. In FIG. 2, the lowermost apple tray is shown in two sizes, on different sides of the phantom line which divides the tray.

Those in the art will appreciate that while the invention has been shown and described in terms of apple tray denesting, the disclosure would enable use of the disclosed manner of operation in other types of denesting applications. Accordingly, the foregoing description has been provided as illustration and not as limitation on the scope of the invention.

What is claimed is:

1. A fruit tray denesting apparatus for rectangular trays having long sides and short sides comprising, in association with a conveyer which delivers the trays with the short sides of the trays parallel to the direction of movement of the conveyer, means for holding a nested stack of trays above the conveyer with the trays in an upright orientation, a carriage arrangement which is vertically moveable relative to the tray stack and relative to the conveyer, support arms on the carriage arrangement which are positioned to support the nested stack of trays at the short sides of the trays when the carriage arrangement is moved vertically for contact with the tray stack, and grasping arms on the carriage arrangement which are positioned to make contact with the short sides of the tray for grasping the lowermost tray in the tray stack to be moveable with the carriage arrangement, the support arms and the grasping arms being independently rotatable.

2. The apparatus of claim 1, comprising two grasping arms for each short side of the tray and two support arms for each short side of the tray.

3. The apparatus of claim 1, wherein the nested stack holding means comprises an openable escapement.

4. The apparatus of claim 1, wherein the support arms are provided with changeable surfaces which define the upper surfaces of the support arms.

5. The apparatus of claim 4, wherein the support surface is textured.

6. The apparatus of claim 1, wherein the carriage arrangement is slidably removeable and/or interchangeable.

7. The apparatus of claim 1, wherein the fruit trays are molded pulp apple trays.

8. The apparatus of claim 2, wherein the fruit trays are molded pulp apple trays.

9. The apparatus of claim 3, wherein the fruit trays are molded pulp apple trays.

10. The apparatus of claim 4, wherein the fruit trays are molded pulp apple trays.

11. The apparatus of claim 5, wherein the fruit trays are molded pulp apple trays.

12. The apparatus of claim 6, wherein the fruit trays are molded pulp apple trays.

13. An apple tray denesting apparatus for denesting molded pulp rectangular apple trays having long sides and short sides comprising, in association with a conveyer which delivers the trays with the short sides of the trays parallel to the direction of movement of the conveyer, an openable escapement for holding a nested stack of trays above the conveyer with the trays in an upright orientation, a carriage arrangement which is vertically movable relative to the escapement and relative to the conveyer, support arms provided on the carriage arrangement positioned for supporting the nested stack at the short ends of the trays while the escapement is open, grasping arms positioned on the carriage arrangement for grasping the lowermost tray in the tray stack at the short sides of the tray, and means for withdrawing the lowermost tray from the nested stack for placement on the conveyer, wherein the support arms and the grasping arms on each short side of the tray are independently rotatable about a common shaft.

14. The apparatus of claim 13, wherein the apparatus is provided with four support arms and four grasping arms, which are provided as two support arm/grasping arm pairs for contact with each short side of the trays.

15. The apparatus of claim 13, which operates in the following cycle:

raising of the carriage arrangement to bring the support arms into a tray-accepting position;

opening of the escapement to allow the nested stack of trays to be supported by the support arms;

closing of the escapement to again support the weight of the nested stack of trays;

grasping the underside of the lowermost tray in the nested tray stack by contact between the grasping arms and the short sides of the lowermost tray;

lowering of the carriage arrangement to dissociate the lowermost tray from the tray stack while the lowermost tray is held by the grasping arms; and release of the tray onto the conveyer.

16. The apparatus of claim 13, wherein the carriage arrangement is slidably removeable and/or interchangeable.

17. The apparatus of claim 13, wherein the support arms are provided with changeable surfaces which define the upper surfaces of the support arms.

18. The apparatus of claim 17, wherein the support surface is textured.

19. A denesting apparatus for trays having four sides comprising, in association with a conveyer which delivers the trays with two sides of the trays parallel to the direction of movement of the conveyer, means for holding a nested stack of the trays above the conveyer with the trays in an upright orientation, a carriage arrangement which is vertically moveable relative to the tray stack and relative to the conveyer, support arms on the carriage arrangement which support the nested stack of trays when the carriage arrangement is moved vertically for contact with the tray stack, and grasping arms on the carriage arrangement which are positioned to make contact with the lowermost tray in the tray stack by the sides of the trays which are parallel to the direction of movement of the conveyer, and further comprising shafts about which the support arms and grasping arms are independently rotatable.

20. The apparatus of claim 19, comprising two grasping arms and two support arms for each conveyer parallel side of the tray.

21. The apparatus of claim 19, wherein the nested stack holding means comprises an openable escapement.

22. The apparatus of claim 19, wherein the support arms are provided with changeable surfaces which define the upper surfaces of the support arms.

23. The apparatus of claim 19, wherein the support surface is textured.

24. The apparatus of claim 19, wherein the carriage arrangement is slidably removeable and/or interchangeable.

25. A method of denesting rectangular fruit trays having long sides and short sides from a nested stack of trays, which comprises:

positioning a nested stack of the fruit trays above a conveyer in upright orientation, with the short sides of the trays parallel to the direction of movement of the conveyer;

providing means for grasping the lowermost tray in the nested stack, which means are positioned to grasp the short sides of the trays;

grasping the lowermost tray in the nested stack by the short sides of the tray; and releasing the lowermost tray above the conveyor to drop onto the conveyer.

26. The method of claim 25, wherein the fruit trays are molded pulp apple trays.

27. A method of denesting rectangular fruit trays having long sides and short sides from a nested stack of trays, which comprises:

positioning a nested stack of fruit trays above a conveyor in upright orientation, with the short sides of the trays parallel to the direction of movement of the conveyor;

providing pivoting lance means for grasping the lowermost tray in the nested stack, which are positioned to grasp the short sides of the trays;

grasping the lowermost tray in the tray stack; and releasing the lowermost tray onto the conveyor.

* * * * *